(12) United States Patent
Gulsen et al.

(10) Patent No.: US 11,853,461 B2
(45) Date of Patent: *Dec. 26, 2023

(54) DIFFERENTIAL PRIVACY SECURITY FOR BENCHMARKING

(71) Applicant: Workday, Inc., Pleasanton, CA (US)

(72) Inventors: Denis Gulsen, Redwood City, CA (US); Ankit Aggarwal, Cupertino, CA (US)

(73) Assignee: Workday, Inc., Pleasanton, CA (US)

( * ) Notice: Subject to any disclaimer, the term of this patent is extended or adjusted under 35 U.S.C. 154(b) by 134 days.

This patent is subject to a terminal disclaimer.

(21) Appl. No.: 17/194,105

(22) Filed: Mar. 5, 2021

(65) Prior Publication Data

US 2021/0192080 A1 Jun. 24, 2021

Related U.S. Application Data

(63) Continuation of application No. 15/693,787, filed on Sep. 1, 2017, now Pat. No. 10,970,417.

(51) Int. Cl.
| | | |
|---|---|---|
| *G06F 21/62* | (2013.01) | |
| *G06F 17/18* | (2006.01) | |
| *H04L 9/06* | (2006.01) | |
| *G06F 7/58* | (2006.01) | |
| *G06F 7/491* | (2006.01) | |

(52) U.S. Cl.
CPC .......... *G06F 21/6254* (2013.01); *G06F 7/582* (2013.01); *G06F 17/18* (2013.01); *H04L 9/0643* (2013.01); *H04L 9/0662* (2013.01); *G06F 7/4912* (2013.01); *G06F 7/4915* (2013.01)

(58) Field of Classification Search
CPC ...... G06F 21/6254; G06F 7/582; G06F 17/18; G06F 7/4912; G06F 7/4915; H04L 9/0643; H04L 9/0662
See application file for complete search history.

(56) References Cited

U.S. PATENT DOCUMENTS

| | | |
|---|---|---|
| 8,578,501 B1 | 11/2013 | Ogilvie |
| 8,646,030 B2 | 2/2014 | Hu |
| 9,202,026 B1 | 12/2015 | Reeves |
| 9,377,991 B1 | 6/2016 | Rapport |
| 10,181,043 B1 | 1/2019 | Pauley, Jr. |
| 2009/0150362 A1 | 6/2009 | Evenhaim |

(Continued)

*Primary Examiner* — Farid Homayounmehr
*Assistant Examiner* — Suman Debnath
(74) *Attorney, Agent, or Firm* — Van Pelt, Yi & James LLP

(57) ABSTRACT

A system for determining a calculation utilizing differential privacy including an interface and a processor. The interface is configured to receive a request to determine result data of a calculation using multitenanted data. The multitenanted data comprises tenant data associated with a plurality of tenants. The processor is configured to: determine the result data by performing the calculation on the multitenanted data; determine whether a deterministic modification is needed to ensure privacy based at least in part on whether a number of participants in the result data is less than a threshold; and in response to determining that the deterministic modification is needed to ensure privacy: determine the deterministic modification; numerically modify the result data using the deterministic modification to determine modified result data; and provide the modified result data.

20 Claims, 9 Drawing Sheets

(56) References Cited

U.S. PATENT DOCUMENTS

| | | |
|---|---|---|
| 2009/0254511 A1 | 10/2009 | Yeap |
| 2009/0300716 A1 | 12/2009 | Ahn |
| 2010/0106470 A1* | 4/2010 | Ichiyama ............... G01R 29/26 703/2 |
| 2011/0022681 A1 | 1/2011 | Simeonov |
| 2013/0111545 A1 | 5/2013 | Sharma |
| 2014/0282949 A1 | 9/2014 | Nath |
| 2014/0373182 A1 | 12/2014 | Peri |
| 2015/0193719 A1* | 7/2015 | Than ............... G06Q 10/06398 705/7.39 |
| 2017/0195307 A1 | 7/2017 | Jones-McFadden |
| 2017/0270318 A1 | 9/2017 | Ritchie |
| 2017/0332409 A1* | 11/2017 | Yerramalli ............... H04L 1/00 |
| 2018/0032748 A1 | 2/2018 | Rueger |
| 2018/0095729 A1* | 4/2018 | Greiner ................. G06F 7/588 |
| 2018/0262514 A1 | 9/2018 | Hall |
| 2018/0285596 A1* | 10/2018 | Jones ................... G06F 21/552 |
| 2019/0058991 A1* | 2/2019 | Al-Kabra ........... H04L 63/0421 |

\* cited by examiner

Deidentified Data

| | Age | Zip Code | Movie Ratings | | | | | |
|---|---|---|---|---|---|---|---|---|
| | | | #1 | #2 | #3 | #4 | #5 | #6 |
| User 1 | 33 | 42856 | 2.6 | 10.0 | 6.5 | 9.0 | 7.4 | 7.7 |
| User 2 | 50 | 75582 | 4.5 | 5.2 | 9.8 | 8.5 | 6.4 | 9.3 |
| User 3 | 57 | 22851 | 7.8 | 2.2 | 2.9 | 5.9 | 6.7 | 7.4 |
| User 4 | 20 | 76001 | 9.0 | 8.4 | 6.3 | 2.3 | 9.0 | 8.5 |
| User 5 | 52 | 04803 | 5.0 | 9.0 | 6.5 | 5.1 | 8.3 | 7.6 |
| User 6 | 65 | 16664 | 4.8 | 4.7 | 9.8 | 6.2 | 9.1 | 2.4 |
| User 7 | 29 | 22851 | 6.2 | 8.8 | 2.2 | 7.6 | 4.3 | 3.0 |
| User 8 | 56 | 27689 | 8.5 | 3.3 | 6.7 | 2.7 | 4.4 | 5.5 |

600      602

Public Data

| | Name | Age | Zip Code | Movie Ratings | | |
|---|---|---|---|---|---|---|
| | | | | #1 | #2 | #3 |
| User A | Todd Peterson | 29 | 22851 | 6.2 | 8.8 | 2.2 |
| User B | Nick Iverson | 42 | 89353 | 3.1 | 6.4 | 5.4 |
| User C | Kate Cooper | 50 | 75582 | 4.5 | 5.2 | 9.8 |
| User D | Carrie Pettigrew | 36 | 82149 | 9.3 | 8.8 | 2.5 |
| User E | Kip Naughton | 27 | 54467 | 9.5 | 8.1 | 5.0 |
| User F | Paul Miltenberg | 33 | 42856 | 2.6 | 10.0 | 6.5 |
| User G | Jason Hodge | 43 | 79844 | 7.6 | 3.7 | 7.8 |
| User H | Irene Pierce | 65 | 16664 | 4.8 | 4.7 | 6.0 |

Fig. 6

DIFFERENTIAL PRIVACY SECURITY FOR BENCHMARKING

CROSS REFERENCE TO OTHER APPLICATIONS

This application is a continuation of U.S. patent application Ser. No. 15/693,787, now U.S. Pat. No. 10,970,417, entitled DIFFERENTIAL PRIVACY SECURITY FOR BENCHMARKING filed Sep. 1, 2017 which is incorporated herein by reference for all purposes.

BACKGROUND OF THE INVENTION

On a software as a service platform, tenant data is strictly segregated in order to maintain separation of data belonging to different tenants. Tenant data is stored on a set of data partitions securely separated by tenant (e.g., on different computers, on different hard drives, on different virtual machines, etc.) in order to prevent users from accessing data belonging to other tenants. In some situations, tenants wish to share data for comparison purposes or to get a more complete view of a situation (e.g., salary surveys or other industry benchmarks) and they provide a data set to a third party in exchange for access to the pooled set. The third party performs computations on the pooled data set and returns reports comprising the computation results to the tenants. Even when user identifying information is removed from report data, reports comprising detailed tenant data or tenant data associated with a small number of tenants may be vulnerable to attacks using external database information to determine the identity of users with data included in the report. This creates a problem where tenants may not be willing to contribute their data for fear that their users' identifying information will be revealed.

BRIEF DESCRIPTION OF THE DRAWINGS

Various embodiments of the invention are disclosed in the following detailed description and the accompanying drawings.

FIG. 6 is a diagram illustrating an embodiment of deidentified data and public data.

DETAILED DESCRIPTION

Figure 1:
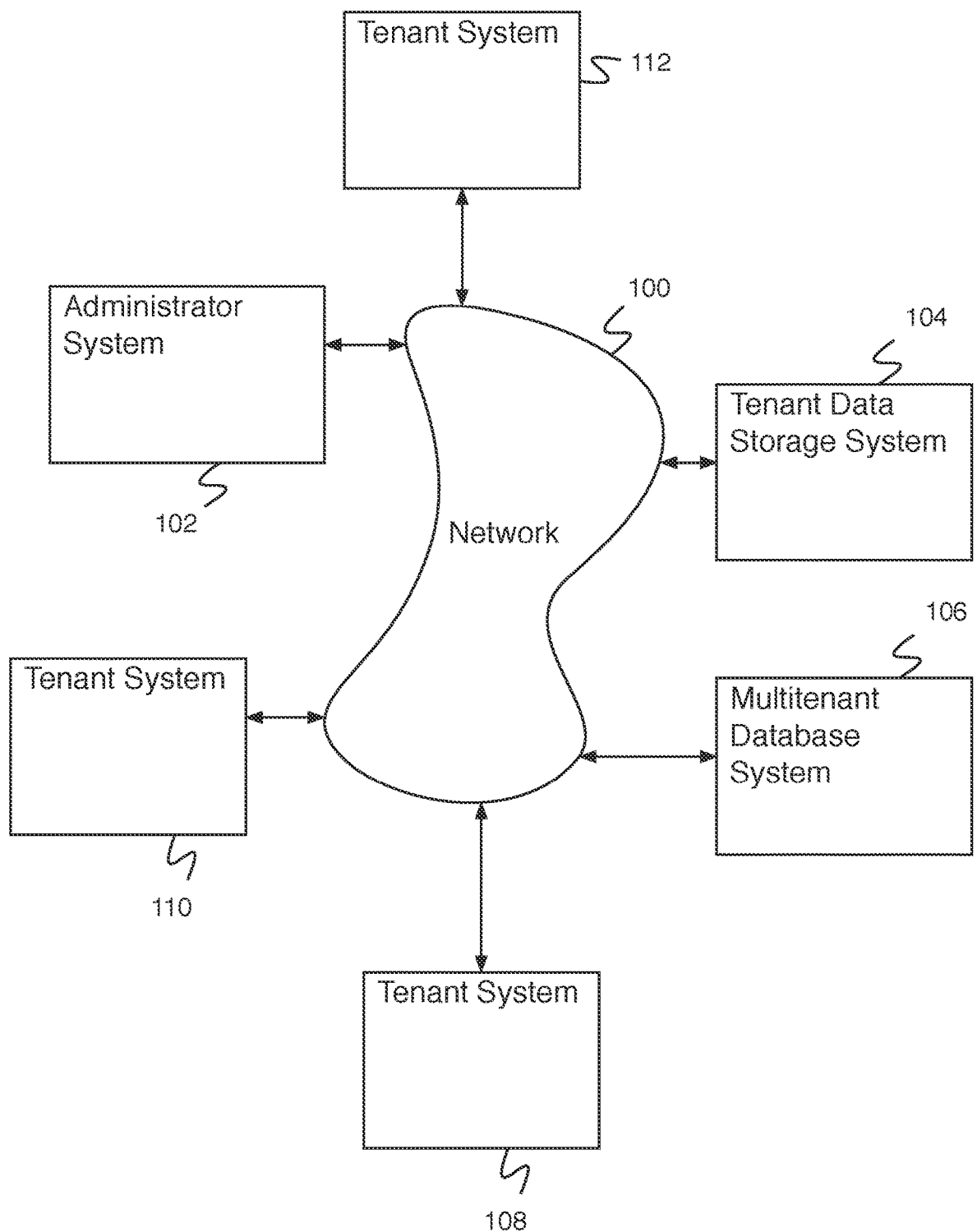
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for determining a calculation using differential privacy is disclosed. The system for determining a calculation using differential privacy comprises an interface and a processor. The interface is configured to receive a request to determine a result of a calculation using multitenanted data. The processor is configured to determine result data by performing the calculation on the multitenanted data, determine a deterministic modification in the event that it is determined that the deterministic modification is needed to ensure privacy, modify the result data using the deterministic modification to determine modified result data, and provide the modified result data. In some embodiments, the system for determining a calculation utilizing differential privacy comprises a memory coupled to the processor and configured to provide the processor with instructions.

A system for differential privacy screening for benchmarking comprises a set of tenant data storage units and a commingling storage unit. Tenant data for a tenant is stored for typical system use on a tenant data storage unit. A tenant has access to its tenant data stored on its associated tenant data storage unit but not to tenant data stored on tenant data storage units associated with other tenants. In some cases, it is useful for a tenant to have access to other tenants' data—for example, for the calculation of benchmark reports. For example, a tenant may desire to share its data in order to be able to determine how its own data compares to a broader set of data (e.g., salaries of the tenant's employees as compared to salaries of a broader set of employees). A tenant is prompted to opt in to the secure data commingling system. Tenant data is then commingled with other tenant data from other tenants to form a commingled data set. The tenant can access the results of calculations performed on the commingled data set. Data in the commingled data set is deidentified (e.g., user identifying data is removed) and a tenant is only allowed to view other tenants' data as a group without indication of which data is associated with which tenant. The tenant can customize the calculations performed in order to access the specific data they are interested in.

However, it is possible that individual users will be able to be identified from report data even though their identifying information has been removed, by linking their data to associated public data sets containing similar data linked to identifying information. This effectiveness of this technique is enhanced when a calculation is crafted that produces a report comprising data associated with only a small number of tenants (e.g., 2 tenants, 3 tenants, etc.). In order to prevent users from being identified using this technique, calculation results are obfuscated using a deterministic modification in the case where result data in a report is associated with less than a threshold number of tenants (e.g., 2 or 3 tenants). In some embodiments, the deterministic modification is used in the event that a privacy function has determined that not enough contributors have participated in the resulting data such that an individual contributor may be inferable from the data results. In some embodiments, a participant names their peers and benchmarks are generated based on the named peer set—in these cases deterministic modification is used to modify the benchmark results. After result data is determined, the result data is modified using a deterministic modification to determine modified result data, and the modified result data is provided. The deterministic modification is deterministic (e.g., each time calculation results for a specific calculation are determined, the deterministic modification determined for modifying the calculation results comprises the same deterministic modification). This is necessary to prevent a user from removing the effect of the deterministic modification by executing the calculation a large number of times and averaging the results. In the event the deterministic modification was instead a random number, the average result would converge to the true result. In some embodiments, the deterministic modification comprises a deterministic calculation (e.g., a pseudo random number generator, a hash, etc.) that is seeded in a deterministic way (e.g., with the result data). In some embodiments, the deterministic modification comprises a modification that is stored (e.g., stored when it is first determined and later recalled for future instances of the calculation).

FIG. 1 is a block diagram illustrating an embodiment of a network system. In some embodiments, the network system of FIG. 1 comprises a system for benchmark definition using client based tools. In the example shown, the secure data commingling system or multitenant database system 106 comprises a processor for receiving a request to determine a result of a calculation using multitenanted data (e.g., tenant data from multiple tenants stored on the secure data commingling system) and determining result data by performing the calculation on the multitenanted data. The processor is for determining a deterministic modification in the event that it is necessary for privacy, modifying the result data using the deterministic modification to determine a modified result data, and providing the modified result data.

Tenant system 108, tenant system 110, and tenant system 112 store data in separate areas of tenant data storage system 104. This separation ensures that a given tenant's data is secure. However, there are times when it is useful to have access to have access to a pool of many tenants' data in exchange for providing access to the tenant's own data. Data that is part of the multitenant pool of data is stored either in tenant data storage system 104 in a commingling area or in multitenant database system 106. Multitenant database system 106 enables access to the multitenant pool of data as part of a service (e.g., a benchmarking service that enables comparison of tenant data with a larger pool of data from other tenants). A tenant can opt in to sharing data in exchange for access to the data pool and opting in enables multitenant database system 106 to access a copy of relevant data associated with the opt in plan and appropriately stripped of identification information. Administrator system 102 is able to administrate different components of the system including multitenant database system 106.

In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. Administrator system 102, tenant data storage system 104, multitenant database system 106, and tenant system 108 communicate via network 100. Administrator system 102 comprises an administrator system for use by an administrator. Administrator system 102 comprises an administrator system for executing administrator commands, for configuring tenant data storage system 104 or multitenant database system 106, for querying tenant data storage system 104 or multitenant database system 106, etc. Tenant data storage system 104 comprises a storage system for storing tenant data (e.g., customer organization data). Tenant data storage system 104 comprises a plurality of tenant data storage units for storing tenant data isolated by tenant, and in some cases, a commingling storage unit for storing commingled tenant data. Multitenant database system 106 comprises a database system for providing tenant user access to data stored on either in a commingling storage unit of tenant data storage system 104 or in multitenant database system 106 (e.g., access to add data, view data, modify data, delete data, access reports, execute business processes, etc.). Tenant system 108 comprises a tenant system for use by a tenant user. A tenant user uses tenant system 108 to interact with multitenant database system 106, for example to store database data, to request database data, to request reporting based on database data, etc. In some embodiments, the network system of FIG. 1 comprises a plurality of tenant systems associated with one or more tenants.

Tenant data storage system 104 comprises a tenant data storage system for storing data in a database for a set of tenants. Tenant data storage system 104 comprises a set of distinct tenanted storage systems (for example—separate hard drives, separate virtual machines, etc.) for storing tenant data in such a way that tenants cannot access each other's data. Tenant data storage system 104 additionally comprises a secure data commingling system for managing data transfer from the tenanted storage systems to the commingling storage and for executing data analyses and reporting on the commingling storage unit. Multitenant database system 106 comprises a system for performing database actions (e.g., storing data, modifying data, querying data, performing reports, etc.) on tenant data stored in a commingling storage area of either tenant data storage system 104 or multitenant database system 106. A secure data commingling system includes interfaces for transmitting and receiving tenant data (e.g., from one or more tenant data storage units to a commingling storage area).

Figure 2:
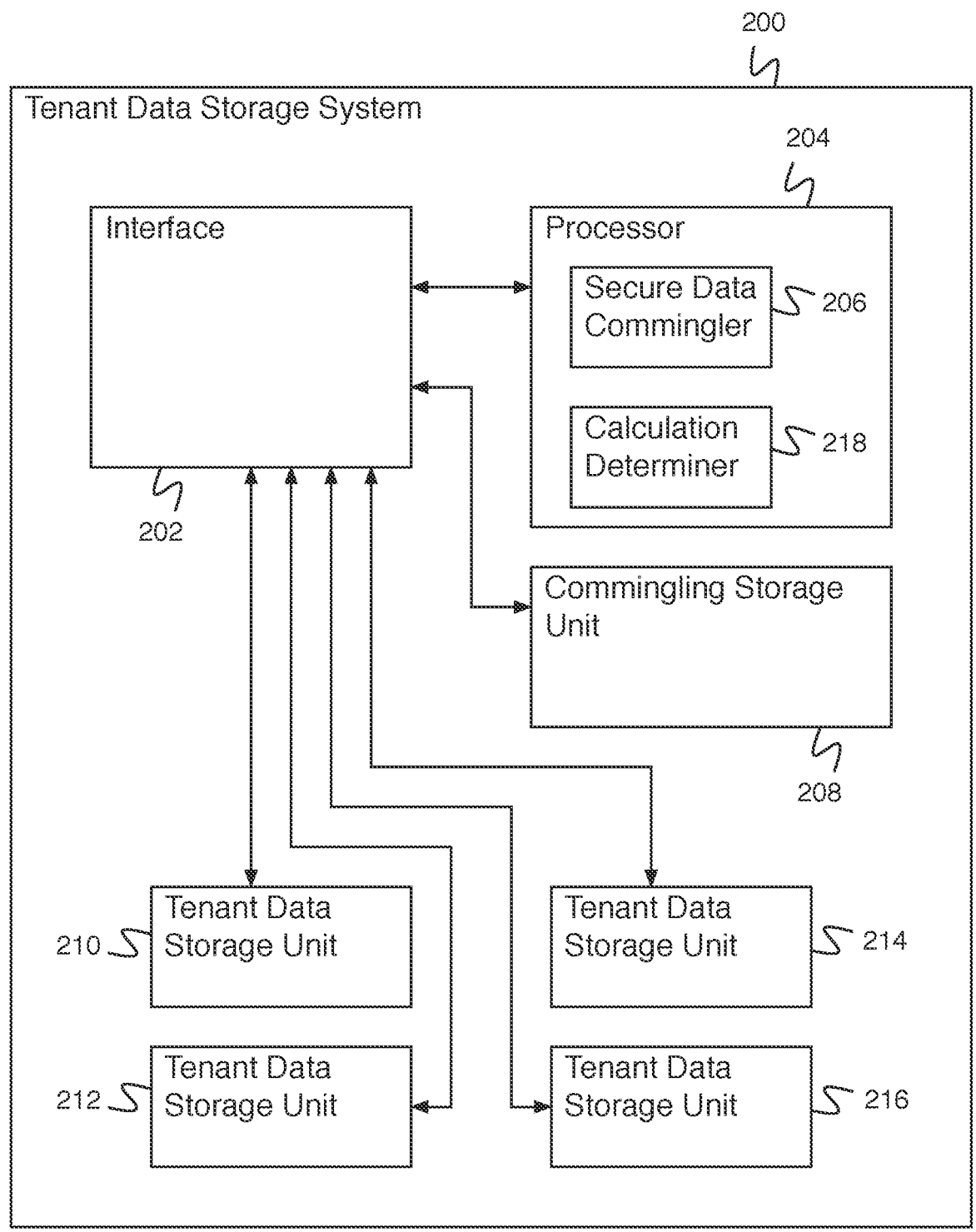
FIG. 2 is a block diagram illustrating an embodiment of a tenant data storage system.

FIG. 2 is a block diagram illustrating an embodiment of a tenant data storage system. In some embodiments, tenant data storage system 200 comprises tenant data storage system 104 of FIG. 1. In the example shown, tenant data storage system 200 is used to store different tenants' data in separate storage areas in tenant data storage unit 210, tenant data storage unit 212, tenant data storage unit 214, and tenant data storage unit 216. Each tenant has associated with it a separate storage area—for example, each tenant data storage unit could be entirely associated with a different single tenant. The plurality of tenant data storage units serves to store data associated with different tenants. Tenant data storage system 200 comprises any appropriate number of tenant data storage units. In various embodiments, the plurality of tenant data storage units comprise tenant data storage units associated with separate computers, tenant data storage units associated with separate hard drives, tenant data storage units associated with separate virtual machines, tenant data storage units associated with separate storage partitions, or tenant data storage units separated in any other appropriate way.

Tenant data storage system 200 additionally comprises commingling storage unit 208 for commingling a portion of tenant data. Tenant data storage system 200 comprises processor 204 and interface 202. Interface 202 comprises an interface for receiving requests to provide or store tenant data (e.g., to and from tenant data storage unit 210, from tenant data storage unit 212, from tenant data storage unit 214, or from tenant data storage unit 216) and for providing and receiving tenant data to be commingled in commingling storage unit 208. Interface 202 additionally comprises an interface for receiving an indication to transfer data to commingling storage unit 208, receiving a request to perform a calculation based on data stored in commingling storage unit 208, providing a calculation result, etc. Processor 204 comprises secure data commingler 206 for indicating to transfer data from a tenant data storage unit to commingling storage unit 208, for determining whether data should be transferred to commingling storage unit 208, etc. Processor 204 additionally comprises calculation determiner 218 for determining result data by performing a calculation on multitenanted data (e.g., data stored in commingling storage unit 208), for determining a deterministic modification, for modifying the result data using the deterministic modification to determine modified result data, for providing the modified result data, etc.

Each tenant data storage unit (e.g., tenant data storage unit 210, tenant data storage unit 212, tenant data storage unit 214, tenant data storage unit 216) comprises a calculation library associated with the tenant associated with the tenant data storage unit.

Figure 3:
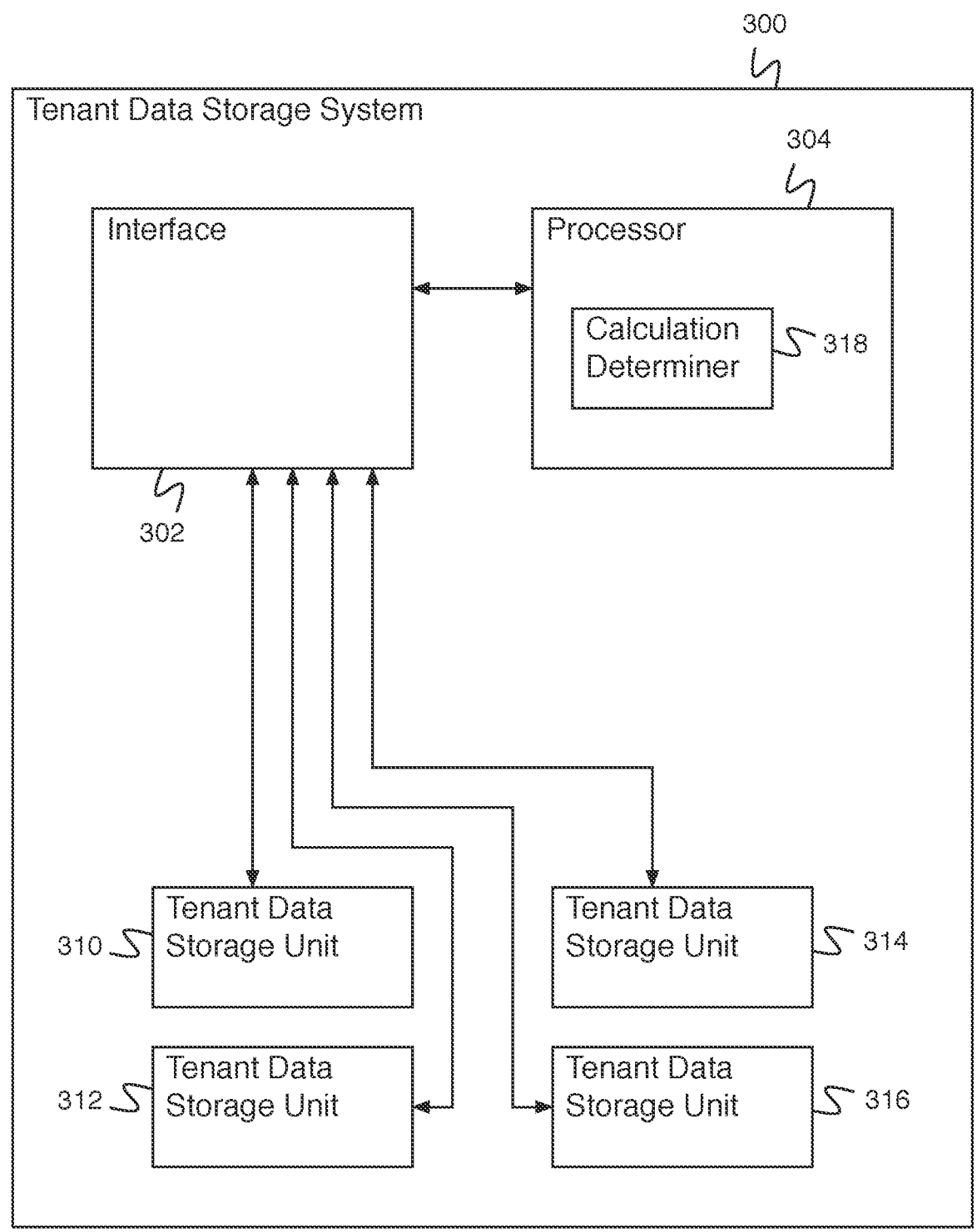
FIG. 3 is a block diagram illustrating an embodiment of a tenant data storage system.

FIG. 3 is a block diagram illustrating an embodiment of a tenant data storage system. In some embodiments, tenant data storage system 300 comprises tenant data storage system 104 of FIG. 1. In the example shown, tenant data storage system 300 is used to store different tenants' data in separate storage areas in tenant data storage unit 310, tenant data storage unit 312, tenant data storage unit 314, and tenant data storage unit 316. Each tenant has associated with it a separate storage area—for example, each tenant data storage unit could be entirely associated with a different single tenant. The plurality of tenant data storage units serves to store data associated with different tenants. Tenant data storage system 300 comprises any appropriate number of tenant data storage units. Tenant data storage system 300 additionally is able to transfer tenant stored data to a commingling storage unit (not shown in FIG. 3) for commingling a portion of tenant data. Tenant data storage system 300 comprises processor 304 and interface 302. Interface 302 comprises an interface for receiving requests to provide or store tenant data (e.g., to and from tenant data storage unit 310, from tenant data storage unit 312, from tenant data storage unit 314, or from tenant data storage unit 316) and for providing and receiving tenant data to be commingled in a commingling storage unit.

Interface 302 additionally comprises an interface for receiving an indication to transfer data to the commingling storage unit, receiving a request to perform a calculation based on data stored in the commingling storage unit, etc. Each tenant data storage unit (e.g., tenant data storage unit 310, tenant data storage unit 312, tenant data storage unit 314, tenant data storage unit 316) comprises a calculation library associated with the tenant associated with the tenant data storage unit.

Processor 304 comprises calculation determiner 318 for determining result data by performing a calculation on multitenanted data (e.g., data stored in the commingling storage unit), for determining a deterministic modification, for modifying the result data using the deterministic modification to determine modified result data, for providing the modified result data, etc.

In various embodiments, the plurality of tenant data storage units comprise tenant data storage units associated with separate computers, tenant data storage units associated with separate hard drives, tenant data storage units associated with separate virtual machines, tenant data storage units associated with separate storage partitions, or tenant data storage units separated in any other appropriate way.

Figure 4:
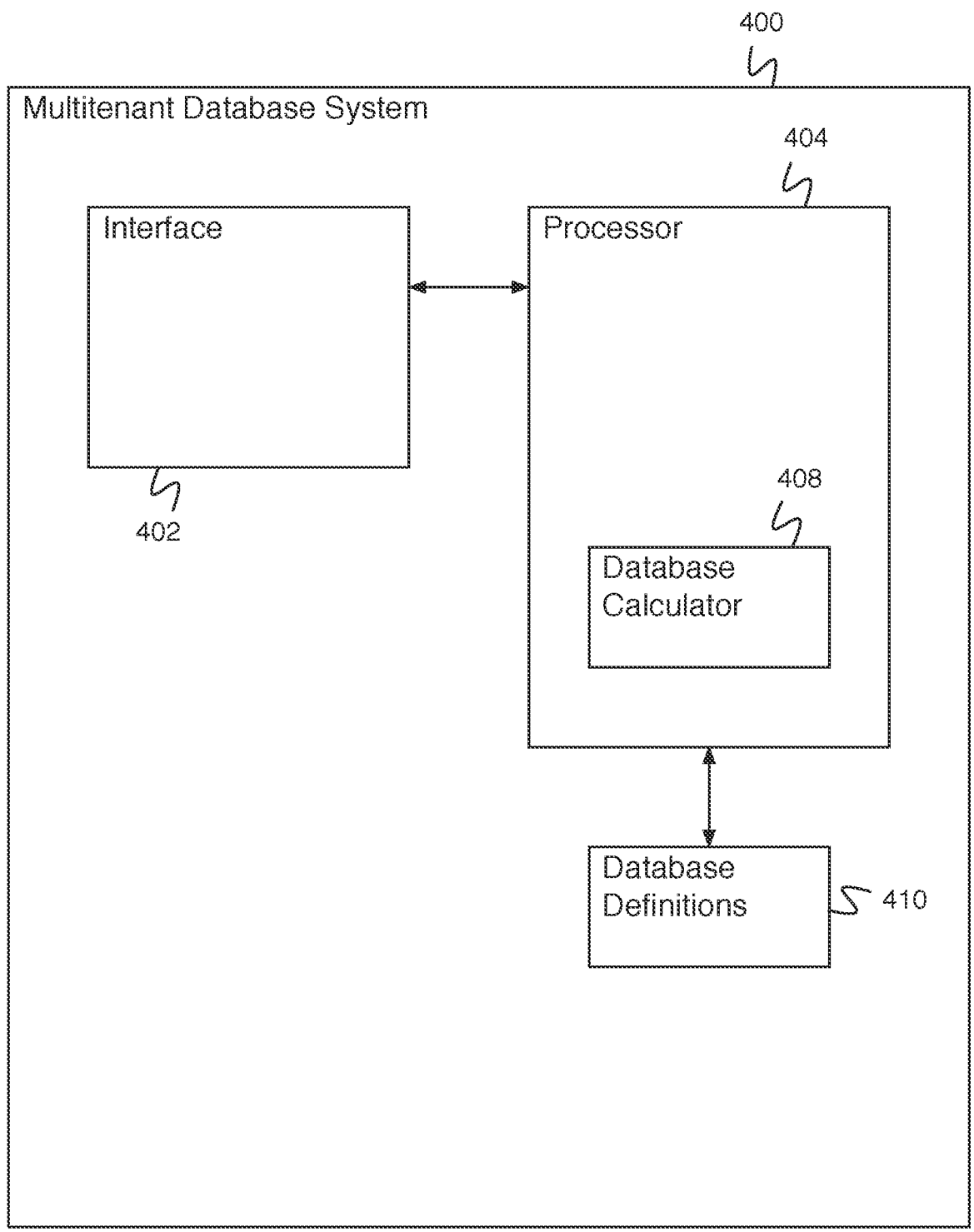
FIG. 4 is a block diagram illustrating an embodiment of a multitenant database system.

FIG. 4 is a block diagram illustrating an embodiment of a multitenant database system. In some embodiments, multitenant database system 400 is used to implement multitenant database system 106 of FIG. 1 with the tenant data storage system of FIG. 2. In the example shown, multitenant database system 400 receives a request, via interface 402, from a user for a service that uses multitenanted data. Database calculator 408 of processor 404 using database definitions 410 determines a report using data stored in a commingling storage unit and provides the report to the user.

The data in commingling storage unit is acquired using a secure data commingler from a number of tenant data storage units. A tenant can opt into sharing data for use by a service (e.g., a benchmarking service) and the data is transferred to a commingling storage unit. The data is transferred in some cases automatically when the data is updated so that the data stored in the commingling storage unit is always up to date.

In some embodiments, database calculator 408 comprises a calculation determiner for determining result data by performing a calculation on multitenanted data (e.g., data stored in the commingling storage unit), for determining a deterministic modification, for modifying the result data using the deterministic modification to determine modified result data, for providing the modified result data, etc.

Figure 5:
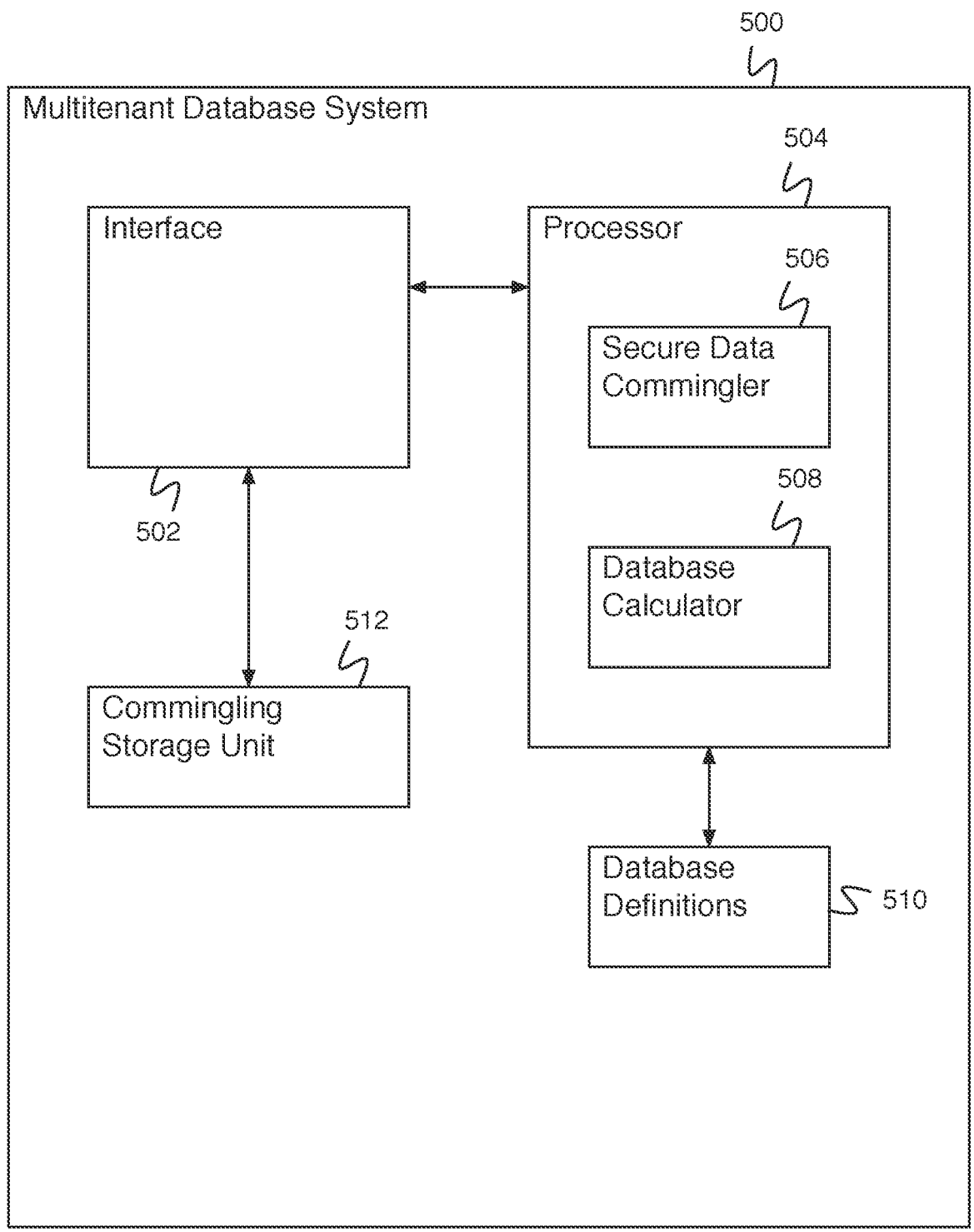
FIG. 5 is a block diagram illustrating an embodiment of a multitenant database system.

FIG. 5 is a block diagram illustrating an embodiment of a multitenant database system. In some embodiments, multitenant database system 500 is used to implement multitenant database system 106 of FIG. 1 with the tenant data storage system of FIG. 3. In the example shown, multitenant database system 500 receives a request, via interface 502, from a user for a service that uses multitenanted data. Database calculator 508 of processor 504 using database definitions 510 determines a report using data stored in a commingling storage unit (e.g., commingling storage unit 512) and provides the report to the user. The data in commingling storage unit 512 is acquired using secure data commingler 506 from a number of tenant data storage units. A tenant can opt into sharing data for use by a service (e.g., a benchmarking service) and the data is transferred to a commingling storage unit (e.g., commingling storage unit 512). The data is transferred in some cases automatically when the data is updated so that the data stored in the commingling storage unit is always up to date.

In some embodiments, database calculator 508 comprises a calculation determiner for determining result data by performing a calculation on multitenanted data (e.g., data stored in commingling storage unit 512), for determining a deterministic modification, for modifying the result data using the deterministic modification to determine modified result data, for providing the modified result data, etc.

In some embodiments, the commingling storage unit and the secure data commingler is split between two systems and in that case multitenant database system 500 of FIG. 5 can be used in conjunction with tenant data storage system of FIG. 2. In some cases, each of the two commingling storage units are operated by the associated collocated secure data commingler. Data for a report is separately retrieved from each commingling storage unit.

FIG. 6 is a diagram illustrating an embodiment of deidentified data and public data. In some embodiments, deidentified data 600 comprises data with identifying information (e.g., name, social security number, phone number, organizational identification, etc.) removed. In the example shown, deidentified data 600 comprises an age, a zip code, and ratings for six movies, for each of eight users (e.g., user 1 through user 8). Public data 602 comprises public data from a source different from the source of deidentified data 600. In the example shown, public data 602 comprises a name, age, zip code, and ratings for three movies, for each of eight users (e.g., user A through user H). No obvious indication is seen that any of user 1 through user 8 corresponds to any of user A through user H. However, it can be determined that user 1 of deidentified data 600 is the same user as user F of public data 602; user 2 of deidentified data 600 is the same user as user C of public data 602; user 6 of deidentified data 600 is the same user as user H of public data 602; and user 7 of deidentified data is the same user as user A of public data 602. When these users are determined to be same users, data in the corresponding rows can be combined to link data that was not previously linked. Users contributing to the public data set made public their ratings for movies #1, #2, and #3, and the public ratings were associated with the users' names. They did not make public their ratings for movies #4, #5, and #6. Users contributing to deidentified data 600 made public their ratings for all 6 movies, but only based on the condition that their identifying information is removed from the data. By combining rows from deidentified data 600 with rows from public data 602 that are determined to be associated with the same user, a set of users' ratings for movies #4, #5, and #6 are revealed publicly, even though the users never consented to this reveal. The goal of differential privacy security for benchmarking is to allow a set of user data to be deidentified and provided for benchmarking purposes while preventing the kind of data breach from occurring.

Figure 7:
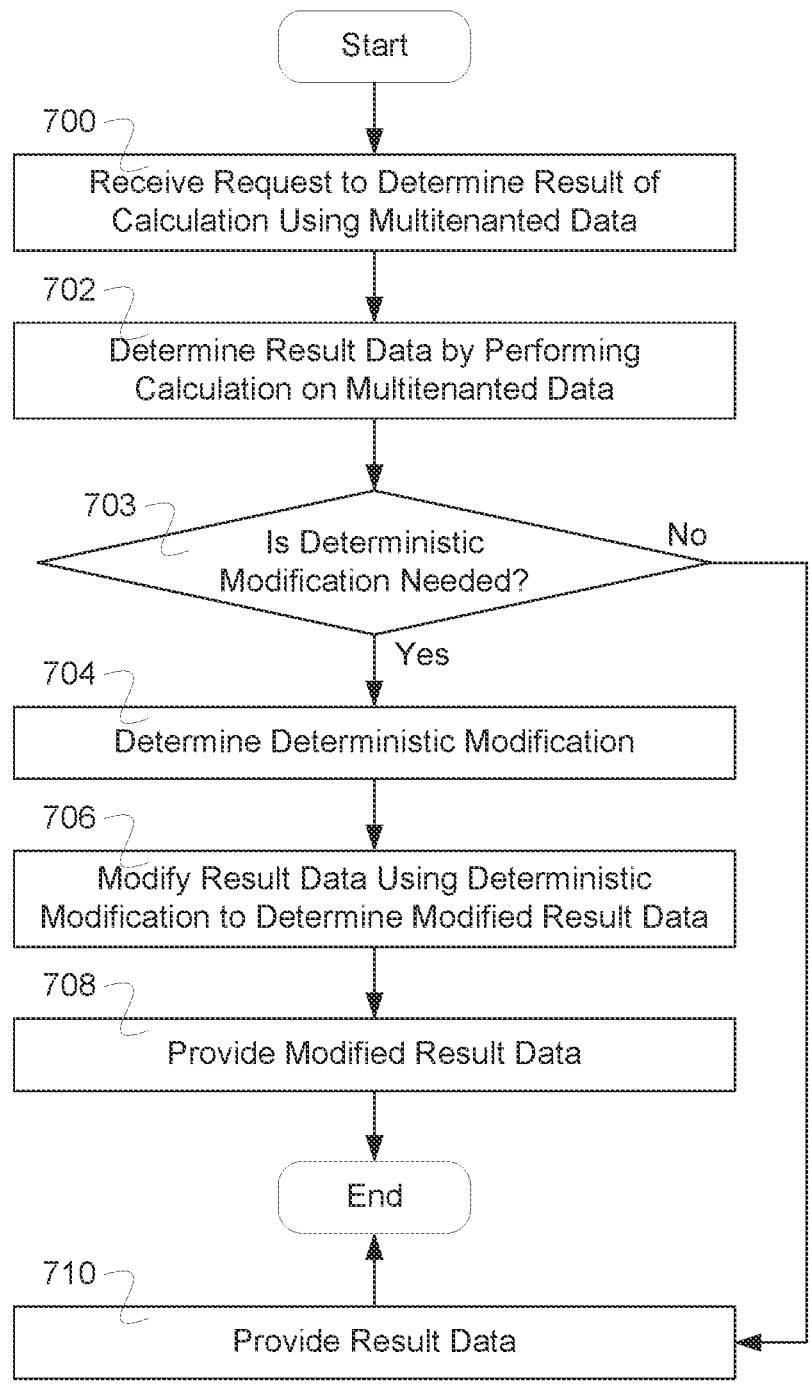
FIG. 7 is a flow diagram illustrating an embodiment of a process for differential privacy screening for benchmarking.

FIG. 7 is a flow diagram illustrating an embodiment of a process for differential privacy screening for benchmarking. In various embodiments, the process of FIG. 7 is executed by calculation determiner 218 of FIG. 2, calculation determiner 318 of FIG. 3, database calculator 408 of FIG. 4, or database calculator 508 of FIG. 5. In the example shown, in 700, a request is received to determine a result of a calculation using multitenanted data. In 702, result data is determined by performing the calculation on the multitenanted data. In 703, it is determined whether a deterministic modification is needed. For example, the need for a deterministic calculation is determined based on the number of participants in the result data (e.g., greater than a threshold) or the need for a deterministic modification is always on (e.g., with a diminishing modification size as the number of participants increases) or always off (e.g., with no privacy included—for example, for a set of privileged clients). In the event that a deterministic modification is not needed, then control passes to 710, which provides result data and then the process ends. In the event that a deterministic modification is needed, then control passes to 704. In 704, a deterministic modification is determined. In 706, the result data is modified using the deterministic modification to determine modified result data. In 708, the modified result data is provided, and the process ends.

In various embodiments, modifying the result data using the deterministic modification comprises multiplying the result data by the deterministic modification, adding the result data to the deterministic modification, applying a deterministic modification function based at least in part on the deterministic modification to the result data, or modifying the result data in any other appropriate way.

Figure 8:
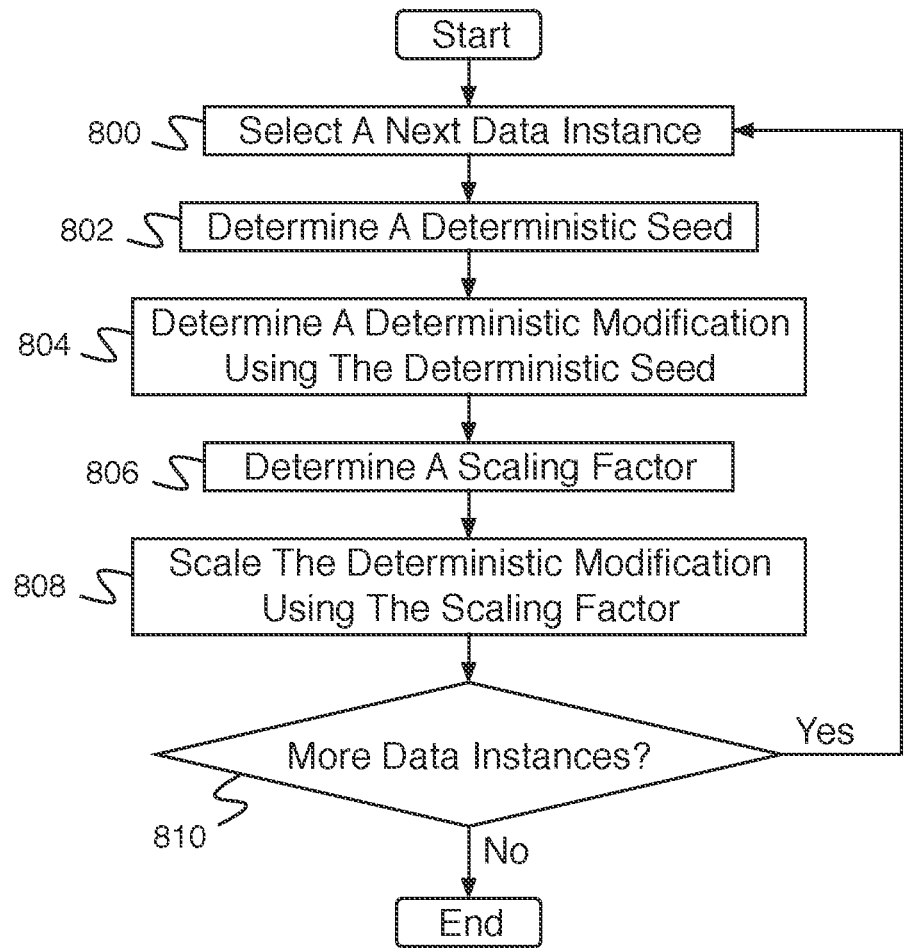
FIG. 8 is a flow diagram illustrating an embodiment of a process for determining a deterministic modification.

FIG. 8 is a flow diagram illustrating an embodiment of a process for determining a deterministic modification. In some embodiments, the process of FIG. 8 implements 704 of FIG. 7. In the example shown, in 800, a next data instance is selected (e.g., the next data instance of a result data set). In some embodiments, the first data instance is selected. In 802, a deterministic seed is determined. The deterministic seed comprises a deterministic seed based at least in part on the selected result data instance. For example, the result data returns a numeric response (e.g., the number 42) and then this numeric response is used as a seed in a random number function (e.g., random_number_function(numeric response) or random_number_function(42) in the prior example that return a pseudorandom number between 0 and 1 based on the seed=numeric response). In various embodiments, the deterministic seed comprises the selected result data instance, an identifier associated with the selected result data instance, a deterministic function of the selected result data instance, or any other appropriate deterministic seed. The deterministic seed is determined such that the same deterministic seed is always determined for a given value of the data instance. In 804, a deterministic modification is determined using the deterministic seed. A deterministic modification comprises a data instance modification determined in a deterministic way. The deterministic modification is deterministic with respect to the deterministic seed, e.g., the deterministic modification is determined such that the same deterministic modification is always determined for a given value of the deterministic seed. For example, the value of the random_number_function(numeric response) is scaled and added to the result data (e.g., scaling=0.03*result data; new_result_data=scaling*random_number_function(numeric response), where the random_number_function returns a number between 0 and 1). In various embodiments, determining the deterministic modification comprises determining a pseudorandom number, determining a hash function, or determining any other appropriate deterministic modification. The deterministic modification determiner comprises a function chosen to appear random (e.g., a change in the input to the deterministic modification determiner results in a change to the output that is difficult to predict).

In some embodiments, the deterministic modification is based at least in part on the calculation that produced the result data set. For example, the pseudorandom number generator properties are based at least in part on the calculation that produced the result data set, the hash function properties are based at least in part on the calculation that produced the result data set, etc.

In 806, a scaling factor is determined. The scaling factor comprises a scaling factor for scaling the deterministic modification (e.g., according to the result data set standard deviation, according to the number of tenants represented in the result data set, etc.). The deterministic modification is calibrated to the data set standard deviation in order to appear as noise on top of the data without substantially changing the data set (e.g., the deterministic modification range is determined to be a fraction of the data set standard deviation). The deterministic modification is calibrated to the number of tenants represented in the result data set in order to obfuscate the data to a greater degree when fewer tenants are present. In 808 the deterministic modification is scaled using the scaling factor. In 810, it is determined whether there are more data instances (e.g., in the result data set). In the event it is determined that there are more data instances, control passes to 800. In the event it is determined that there are not more data instances, the process ends.

In some embodiments, a user executes a report R to determine the Median FIE (Number of Full Time Employees) for Technology companies. Because the system desires not to return the true value in order to protect a client's privacy, the following deterministic algorithm is applied:

the query is executed against a data warehouse and the query result QR is received, which includes the true median FTE and metadata about the query result (in our case, the number of participants in the query result); and a function F is applied which accepts the true median FTE value and the number of participants in the query result and applies the following transformation: F(Actual, Participants)=Actual+(1/# participants).

This has the effect of applying an ever decreasing amount of error to the result as the number of participants in the query result grows. In various embodiments, a decreasing effect is achieved using an exponential function, a Laplace transform, or any other appropriate function.

Figure 9:
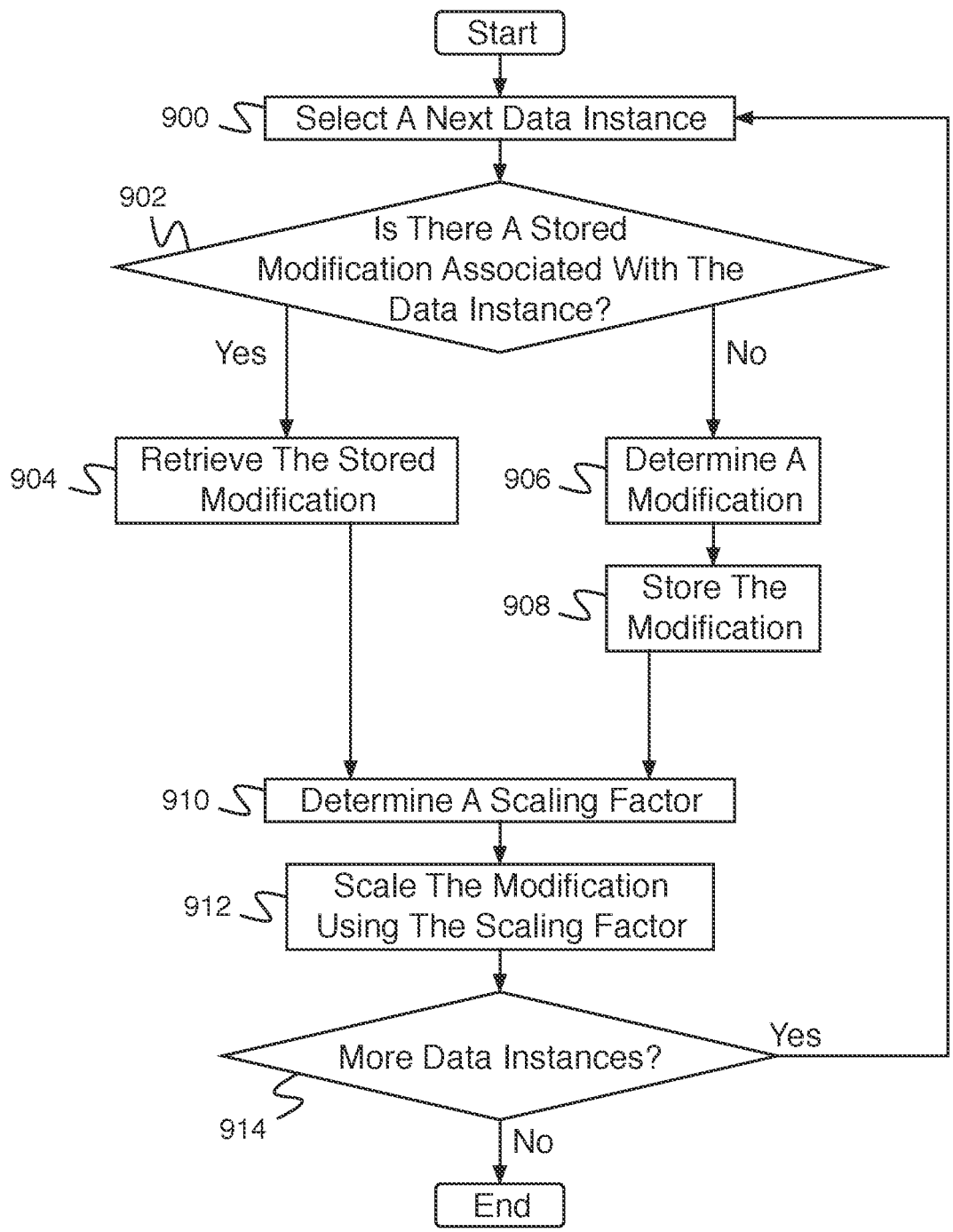
FIG. 9 is a flow diagram illustrating an embodiment of a process for determining a deterministic modification.

FIG. 9 is a flow diagram illustrating an embodiment of a process for determining a deterministic modification. In some embodiments, the process of FIG. 9 implements 704 of FIG. 7. In the example shown, in 900, a next data instance is selected (e.g., the next data instance of a result data set). In some embodiments, the first data instance is selected. In 902, it is determined whether there is a stored modification associated with the data instance (e.g., the selected data instance). In the event it is determined that there is a stored modification associated with the data instance, control passes to 904. In 904, the stored modification is retrieved. Control then passes to 910. In the event it is determined in 902 that there is not a stored modification associated with the data instance, control passes to 906. In 906, a modification is determined. The modification comprises a deterministic modification, a non-deterministic modification, or a modification determined in any appropriate way. In 908, the modification is stored. In 910, a scaling factor is determined (e.g., according to result data set standard deviation, number of tenants present in the result data set, etc.). In 912, the modification is scaled using the scaling factor. In 914, it is determined whether there are more data instances (e.g., in the result data set). In the event it is determined that there are more data instances, control passes to 900. In the event it is determined that there are not more data instances, the process ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
an interface configured to:
receive a request to determine result data of a calculation using multitenanted data, wherein the multitenanted data comprises tenant data associated with a plurality of tenants;
a hardware processor configured to:
determine the result data by performing the calculation on the multitenanted data;
determine whether a numerical modification of the result data is needed to ensure privacy based at least in part on whether a number of participants in the result data is less than a threshold; and
in response to determining that the numerical modification of the result data is needed to ensure privacy:
determine a deterministic modification, wherein the deterministic modification is calibrated to the number of participants represented in the result data to obfuscate the result data to a greater degree when the number of participants are present in the result data is less than the threshold;
numerically modify the result data comprising multiplying the result data by a deterministic modification function to determine modified result data; and
provide the modified result data, wherein the modified result data comprises data associated with the participants in the result data.

2. The system of claim 1, wherein determining the deterministic modification comprises determining a pseudorandom number.

3. The system of claim 2, wherein the pseudorandom number is seeded using the result data.

4. The system of claim 2, wherein determining the deterministic modification is based at least in part on the scaling factor multiplied by the pseudorandom number.

5. The system of claim 1, wherein determining the deterministic modification comprises determining a hash of the result data.

6. The system of claim 1, wherein determining the deterministic modification comprises determining a hash of an identifier associated with the result data.

7. The system of claim 1, wherein the deterministic modification comprises a modification that is stored.

8. The system of claim 7, wherein determining the deterministic modification comprises accessing a previously determined stored modification.

9. The system of claim 1, wherein numerically modifying the result data using the deterministic modification comprises multiplying the result data by the deterministic modification.

10. The system of claim 1, wherein numerically modifying the result data using the deterministic modification comprises adding the result data to the deterministic modification.

11. The system of claim 1, wherein numerically modifying the result data using the deterministic modification comprises applying a deterministic modification function based at least in part on the deterministic modification to the result data.

12. The system of claim 1, wherein numerically modifying the result data uses the deterministic modification and a scaling factor.

13. The system of claim 1, wherein the deterministic modification is based at least in part on the calculation.

14. The system of claim 1, wherein the deterministic modification is based at least in part on the result data.

15. The system of claim 14, wherein the deterministic modification is based at least in part on the standard deviation of the result data.

16. The system of claim 14, wherein the deterministic modification is based at least in part on the number of tenants included in the result data.

17. The system of claim 1, wherein in response to determining that the numerical modification of the result data is not needed to ensure privacy, provide the result data.

18. The system of claim 1, wherein the result data comprises benchmark results.

19. A method, comprising:
- receiving a request to determine result data of a calculation using multitenanted data, wherein the multitenanted data comprises tenant data associated with a plurality of tenants;
- determining, using a processor, the result data by performing the calculation on the multitenanted data;
- determining whether a numerical modification of the result data is needed to ensure privacy based at least in part on whether a number of participants in the result data is less than a threshold; and
- in response to determining that the numerical modification of the result data is needed to ensure privacy:
  - determining a deterministic modification, wherein the deterministic modification is calibrated to the number of participants represented in the result data to obfuscate the result data to a greater degree when the number of participants are present in the result data is less than the threshold;
  - numerically modifying the result data comprising multiplying the result data by a deterministic modification function to determine modified result data; and
  - providing the modified result data, wherein the modified result data comprises data associated with the participants in the result data.

20. A computer program product, the computer program product being embodied in a non-transitory computer readable storage medium and comprising computer instructions for:
- receiving a request to determine result data of a calculation using multitenanted data, wherein the multitenanted data comprises tenant data associated with a plurality of tenants;
- determining, using a processor, the result data by performing the calculation on the multitenanted data;
- determining whether a numerical modification of the result data is needed to ensure privacy based at least in part on whether a number of participants in the result data is less than a threshold; and
- in response to determining that the numerical modification of the result data is needed to ensure privacy:
  - determining a deterministic modification, wherein the deterministic modification is calibrated to the number of participants represented in the result data to obfuscate the result data to a greater degree when the number of participants are present in the result data is less than the threshold;
  - numerically modifying the result data comprising multiplying the result data by a deterministic modification function to determine modified result data; and
  - providing the modified result data, wherein the modified result data comprises data associated with the participants in the result data.

* * * * *